United States Patent [19]

Watanabe

[11] Patent Number: 5,165,798
[45] Date of Patent: Nov. 24, 1992

[54] ELECTRONIC CLINICAL THERMOMETER WITH SOFT FLEXIBLE CASING

[75] Inventor: Minoru Watanabe, Saitama, Japan

[73] Assignee: Citizen Watch Co. Ltd., Tokyo, Japan

[21] Appl. No.: 703,120

[22] Filed: May 21, 1991

[30] Foreign Application Priority Data

May 25, 1990 [JP] Japan .................. 2-54098[U]

[51] Int. Cl.$^5$ .................. G01K 1/08; A61B 5/00
[52] U.S. Cl. .................. 374/208; 374/158; 128/736
[58] Field of Search .............. 374/100, 151, 158, 208, 374/209; 128/736

[56] References Cited

U.S. PATENT DOCUMENTS

| | | |
|---|---|---|
| 3,576,129 | 4/1971 | Crites . |
| 4,054,057 | 10/1977 | Kluge .................. 374/209 X |
| 4,692,034 | 9/1987 | Fukui et al. .................. 374/208 |
| 4,743,121 | 5/1988 | Takagi et al. .................. 374/208 X |
| 5,013,161 | 5/1991 | Zaragoza et al. .................. 374/208 |

FOREIGN PATENT DOCUMENTS

| | | |
|---|---|---|
| 0171769 | 2/1986 | European Pat. Off. . |
| 0180951 | 5/1986 | European Pat. Off. . |
| 0410186 | 1/1991 | European Pat. Off. . |
| 111428 | 5/1986 | Japan .................. 374/208 |
| 2148010 | 5/1985 | United Kingdom . |

Primary Examiner—William A. Cuchlinski, Jr.
Assistant Examiner—G. Bradley Bennett
Attorney, Agent, or Firm—Townsend and Townsend

[57] ABSTRACT

An electronic clinical thermometer with a liquid crystal display housed in a soft flexible casing with a frame. The casing has an opening for viewing the liquid crystal display. An upper cover covers this opening, a lower cover covers an opening in the lower side of the casing, and ribs oriented parallel to axes of the respective openings establish a water-tight seal and secure the upper and lower covers to the casing.

7 Claims, 4 Drawing Sheets

ELECTRONIC CLINICAL THERMOMETER WITH SOFT FLEXIBLE CASING

BACKGROUND OF THE INVENTION

1. Field of the Invention

The present invention relates to the structure of an electronic clinical thermometer with a soft flexible casing.

2. Description of the Prior Art

In recent years, electronic clinical thermometers wherein a thermistor is used as a temperature sensor and the temperature is converted in an electronic circuit and displayed by a liquid crystal display element have become widely available on the market.

An electronic clinical thermometer offers many advantages over the conventional mercury clinical thermometer, inasmuch as it does not break when dropped, the digital display si easy to read, there is no need to shake down the mercury level before use, and the like. In addition, with the electronic clinical thermometer it is possible to utilize a shape and materials conducive to easy reading of the temperature, as opposed to a mercury thermometer which must be enclosed in a glass rod to ensure that the mercury is visible.

For example, an oral measurement can be easily made without causing discomfort to the patient if the probe section is formed from a soft flexible material, providing a shape that is well-fitted to the mouth. Accordingly, such as electronic clinical thermometer has been disclosed in Japanese Laid Open Patent Application No. 61-76334. An embodiment of that invention is illustrated in FIG. 1. This thermometer comprises a flexible probe 26 which covers a thermistor lead wire, and a reinforcing plate 23, a circuit substrate 24, and a cover 25 which are securely connected by means of a plurality of screws 22 to a housing section 21 integrally formed in series with the probe 26.

However, the conventional electronic clinical thermometer disclosed in the above-mentioned application has the following drawbacks:

(1) The housing 21 and the cover 25 which are made from a flexible material are secured merely by elastic engagement so that the housing easily peels away.

(2) The reinforcing plate 23, the circuit substrate 24, and the cover 25 are secured to the housing only by the screws 22, so that the connection lacks stability because it is difficult to obtain an adequate securing force in a lapped flat seam in soft material.

(3) Because the electronic circuit part is not completely watertight, the cleaning and sterilization standards required for use in oral measurement cannot be attained.

SUMMARY OF THE INVENTION

An object of the present invention is to provide, with due consideration to the drawbacks of such conventional devices, an electronic clinical thermometer with a watertight structure using a soft flexible material.

The object of the present invention is achieved by the provision of an electronic clinical thermometer with the following configuration. Specifically, the electronic clinical thermometer of the present invention comprises a clinical thermometer element comprising a circuit substrate, an electronic circuit, a liquid crystal display element, and the like, accommodated in an inner casing; a thermometer module from which a sensor projects; an upper cover and a lower cover positioned respectively on the upper and lower surfaces of a frame section covering the periphery of the inner casing and a probe section frame section which communicates with the above-mentioned frame section. A soft flexible casing is interposedly supported by the upper cover and the lower cover adhering to the inner casing. In addition, the electronic clinical thermometer of the present invention comprises a pair of ribs extending over almost the entire periphery of the inside of the frame section of the soft casing, and the inner casing is interposedly supported between the upper cover and the lower cover through the ribs. The electronic clinical thermometer of the present invention also comprises a plurality of holes provided in the ribs of the soft casing, and in at least one of the upper cover and the lower cover a plurality of pins is provided corresponding to the holes in the ribs, so that the pins engage the holes in the ribs. In addition, in the electronic clinical thermometer of the present invention the inner casing, the upper cover, and the lower cover are joined by ultrasonic welding. Furthermore, at least a part of the inner casing corresponding to the liquid crystal display section is formed from a transparent resin, and an opening is provided in the upper cover corresponding to the liquid crystal display section, so that the liquid crystal display can be viewed through the opening in the upper cover and through the inner casing.

BRIEF DESCRIPTION OF ACCOMPANYING DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

The electronic clinical thermometer of the present invention will now be explained with reference to the drawings.

Figure 2:
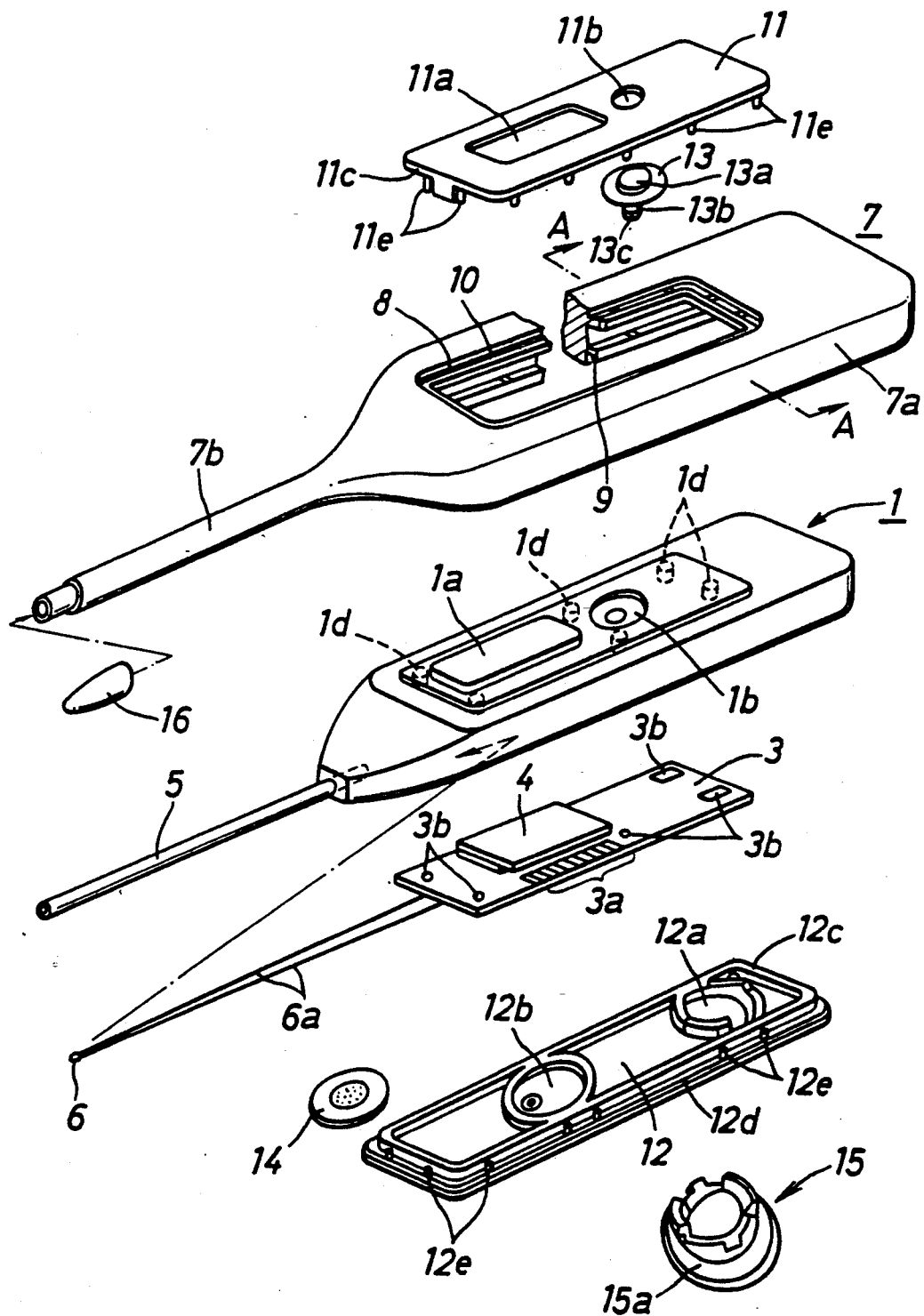
FIG. 2 is an exploded perspective view of one embodiment of an electronic clinical thermometer of the present invention.

FIG. 2 is an exploded perspective view of one embodiment of an electronic clinical thermometer of the present invention.

The electronic clinical thermometer comprises a transparent inner casing 1 fabricated from transparent resin, such as, for example, ABS resin, a soft flexible casing 7 for housing the inner casing 1, and a set of upper and lower covers 11, 12 for partially covering the upper and lower surfaces of the soft flexible casing 7.

Figure 4:
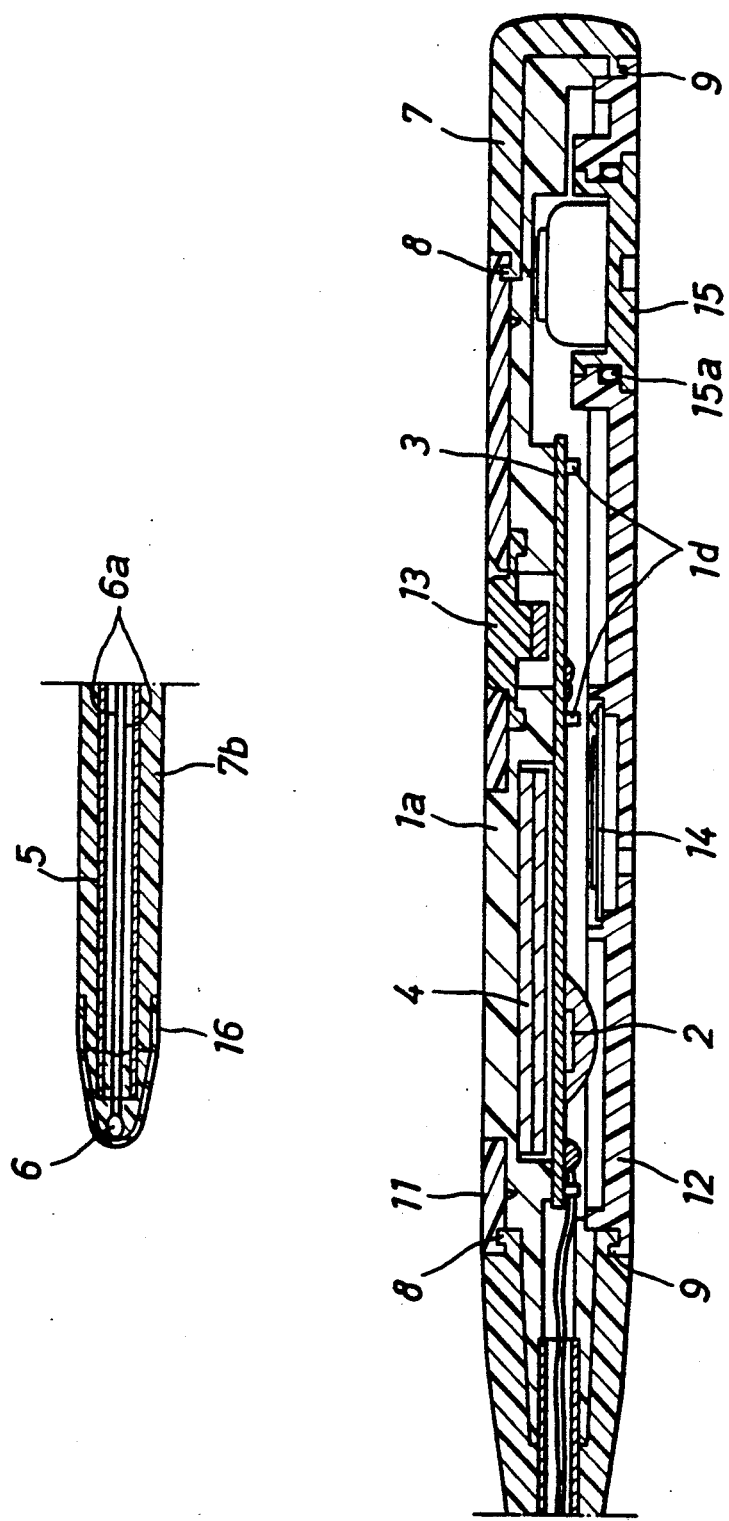
FIG. 4 is a vertical section of the assembled electronic clinical thermometer shown in FIG. 2.
Figure 5:
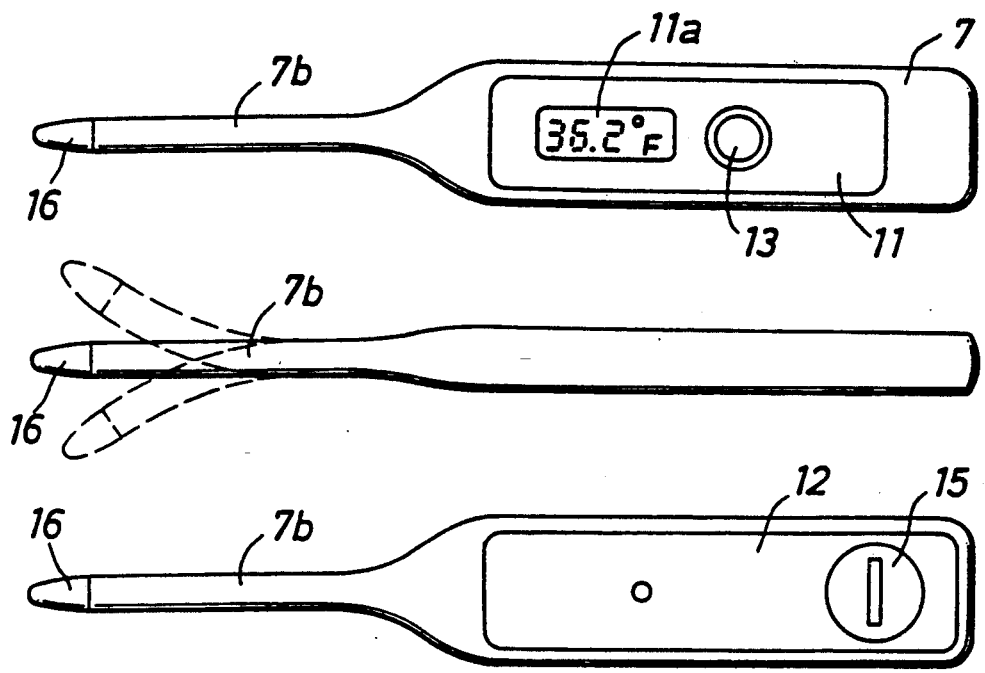
FIG. 5 is a view of the outer appearance of the assembled electronic clinical thermometer shown in FIG. 2.

An element comprising a circuit substrate 3 on which is mounted an electronic circuit including an IC 2 (see FIG. 4), and a liquid crystal display element 4, and the like is accommodated in the inner casing 1. A window 1a through which the display section of the liquid crystal display element 4 can be viewed, and a hole 1b for receiving a switch button 13 are provided in the upper surface of the inner casing 1, and a flexible plastic tube 5 made, for example, from polyurethane, is attached in a watertight manner to one end of the inner casing 1. In addition, six pins 1d extend downward from the upper surface of the inner casing 1.

A required circuit pattern is wired by printing on the circuit substrate 3. The liquid crystal display element 4 is mounted on the upper surface, and the IC 2 and other circuit elements are mounted on the lower surface, of the circuit substrate 3. A terminal 3a for electrically connecting the liquid crystal display element 4 is formed on the side edge of the upper surface of the circuit substrate 3, and six holes 3b are formed in six locations on the circuit substrate 3 at positions corresponding to the pins 1d of the inner casing 1. A lead wire 6a extends from one end of the circuit substrate 3 and a sensor 6 formed from a thermistor is mounted on the end of the lead wire 6a. The lead wire 6a extending from the circuit substrate 3 passes through the tube 5. The module of the clinical thermometer is formed by housing the circuit substrate 3 in the inner casing 1 so that the sensor 6 is exposed at the end of the tube 5.

The soft flexible casing 7 is fabricated from a soft plastic such as vinyl chloride or the like and comprises a frame section 7a which covers the periphery of the inner casing 1 and a probe 7b which communicates with the frame section 7a and protects the sensor 5.

In the clinical thermometer module, the sensor 5 and the tube 6 are inserted into the probe 7b of the flexible casing 7, and the inner casing 1 is housed in the frame section 7a.

An upper rib 8 and a lower rib 9 are provided over the entire periphery of the inside of the frame of the soft flexible casing 7.

Figure 1:
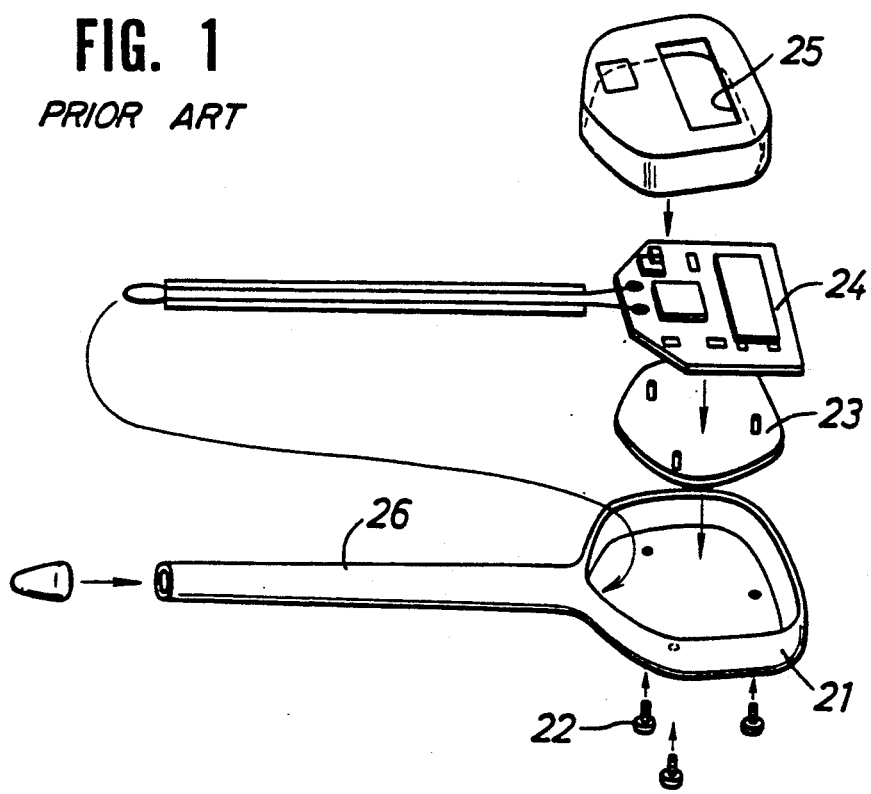
FIG. 1 is an exploded perspective view of one embodiment of a conventional electronic clinical thermometer.
Figure 3:
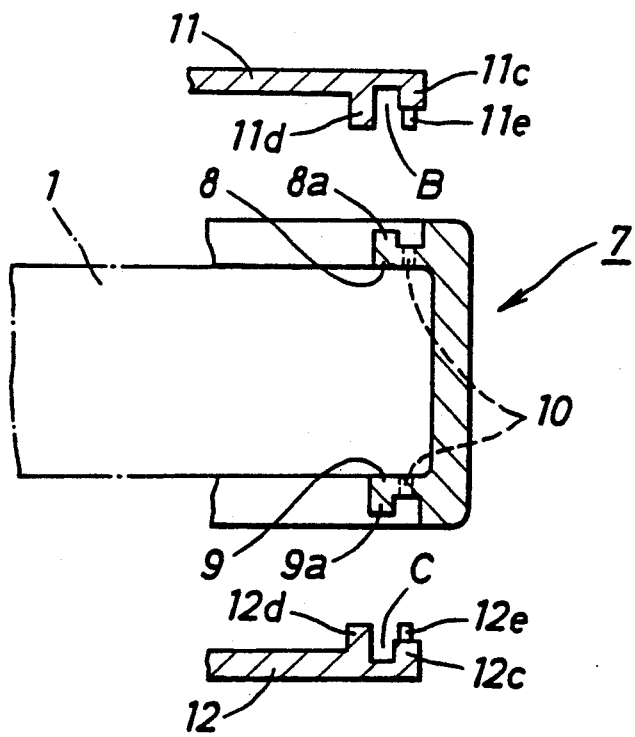
FIG. 3 is a sectional view taken along part of the line A—A of FIG. 2.

FIG. 3 is a sectional view showing the soft flexible casing 7 taken along part of the line A—A of FIG. 2. This view clearly shows a projection 8a provided on the upper rib 8 and a projection 9a formed over the entire periphery of the lower rib 9. The inner casing 1 (shown as a dashed line) is inserted between the upper and lower ribs 8, 9 of the soft flexible casing 7. A plurality of small holes 10 of 0.5 mm diameter, which are formed at a uniform spacing (for example, 1 cm) in the upper and lower ribs 8, 9 of the soft flexible casing 7, is provided. A plurality of pins 11e formed on an upper cover 11, and a plurality of pins 12e formed on a lower cover 12 are inserted into the holes 10, as will be later explained. The covers 11 and 12 may be made, for example, from ABS resin.

In the upper cover 11, an opening 11a is formed at a position which allows the window 1a in the inner case 1 to be viewed, and an opening 11b is formed at a position at which a switch button 13 is exposed, and a pair of ribs 11c, 11d is formed as a double rib on the lower surface. The pins 11e are formed at a uniform spacing on the outside rib 11d. The pins 11e fit into the holes 10 formed in the upper rib 8a of the soft flexible casing 7.

A hole 12a is provided in the lower cover 12 for inserting a battery (omitted from the drawing) which acts as a power source for the electronic clinical thermometer, and an indented section 12b is provided on the upper surface of the lower cover 12 for housing a buzzer 14 which indicates when the final temperature has been attained. In the same manner as on the upper cover 11, a pair of ribs 12c, 12d is provided as a double rib on the peripheral edge of the upper surface of the lower cover 12, and the pins 12e are formed at a uniform spacing on the outside rib 12c. The pins 12e fit into the holes 10 formed in the lower rib 9a of the soft flexible casing 7.

The switch button 13 is made of rubber and is provided with a projection 13a formed in the center of the upper surface. A conductive rubber section 13c is attached to a projection 13b on the lower surface. The switch button 13 is provided with a flange which is thickened at the outer edge to function as an O-ring.

The buzzer 14 is an electronic buzzer, powered from the power source, which buzzes to indicate when the final temperature has been reached.

A battery cover 15 with an O-ring 15a on its peripheral edge is provided for closing off the hole 12a formed in the lower cover 12 to hold the battery.

The electronic clinical thermometer of the present invention is assembled by housing the circuit substrate 3 and the liquid crystal display element 4 in the inner casing 1, then fitting the resulting thermometer module into the soft flexible casing 7. In this state, the inner casing 1 is interposedly supported by the ribs 8, 9 of the soft flexible casing 7, the tube 5 passes through the probe 7b, and the sensor 6 extends from the end of the probe 7b. A sensor cap 16 which is made from a stainless steel, is filled with epoxy resin so that it adheres in a watertight manner to the end of the probe 7b.

Next, the switch 13 is inserted into the hole 1b of the inner casing 1 and the upper cover 11 is fitted into the upper surface of the soft flexible casing 7. At this time, the pins 11e formed in the peripheral edge of the upper cover 11 enter the holes 10 formed in the upper rib 8 of the soft flexible casing 7, and the ends of the pins 11e maintain contact with the inner casing 1. In addition, the projection 8a formed on the upper rib 8 is interposedly pressed into a channel B formed between the double ribs 11c, 11d of the upper cover 11, and because of the high degree of adherence provided, the waterproofing effect is augmented. Following this, the pin e is welded to the inner casing 1 by an ultrasonic welding process.

Next, the buzzer 14 is inserted into the indented section 12b of the lower cover 12, and, in the same manner as in the case of the upper cover 11, the lower surface of the soft flexible casing 7 is covered by the cover 12 and the pins 12e are welded to the inner casing 1 by ultrasonic welding. In this case also, the projection 9a formed on the lower rib 9 is interposedly pressed into a channel C formed between the double ribs 12c, 12d of the upper cover 12 to provide a high degree of adherence.

After the electronic clinical thermometer is assembled in this manner, the battery is inserted through the hole 12a in the lower cover 12, and when the battery cover 15 is closed a watertight seal is provided by the O-ring 15a.

Figure 6:
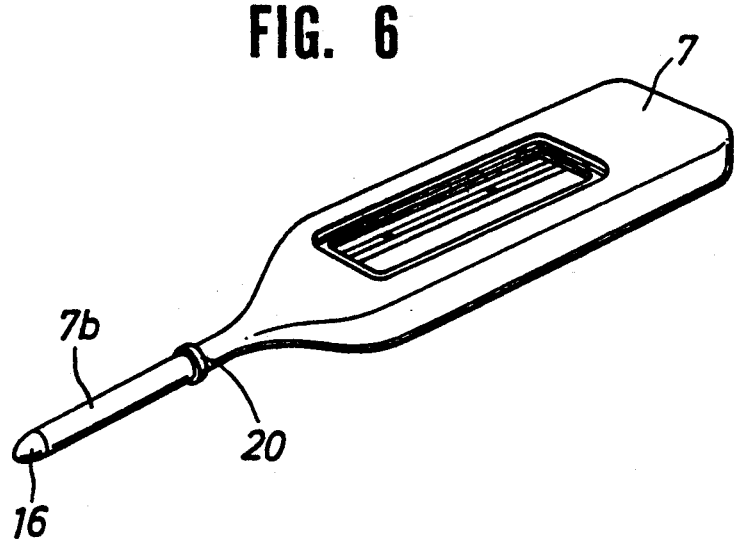
FIG. 6 is a perspective view showing the soft flexible casing of the electronic clinical thermometer of the present invention with one part deformed.

When using the electronic clinical thermometer for measuring the temperature rectally, it is desirable to attach a marker part way along the probe 7b of the soft flexible casing 7, as shown in FIG. 6, to indicate the correct depth of insertion into the rectum. This marker is a projecting ring 20 for increasing the diameter of the probe 7a, but a colored ring may also be used.

Attaching this type of marker to the probe 7a prevents the electronic clinical thermometer from being inserted too far into the rectum, assuring that the correct rectal temperature is obtained.

The present invention offers the following advantages:

(1) The body temperature is measured orally with complete safety because the probe section is flexible.

(2) An oral measurement can be easily made without causing discomfort to the patient because a shape is provided that is well-fitted to the mouth.

(3) Because the thermometer is almost completely covered with a flexible casing, when the thermometer is dropped the shock is absorbed because of effect of the characteristics of the flexible casing, and the internal electronic circuit is protected (4) Because no adhesive or screws are used when the inner casing is secured to the soft flexible casing, and the soft flexible casing is interposedly supported between the inner casing and the upper and lower covers, the soft flexible casing can be reliably secured and is not easily peeled away.

(5) Because a watertight structure can be easily provided, the cleaning and sterilization necessary to use the clinical thermometer orally can be accomplished so that the unit is hygienic.

(6) The operation of securing the inner casing to the upper and lower covers by ultrasonic welding is performed stably and in a very short time. Assembly costs are low and a high degree of watertightness is reliably ensured.

(7) Because ribs are provided on the soft flexible casing the binding force is high.

(8) The interposition of the pins on the upper and lower covers in the holes in the rib section ensures that the parts are reliably secured.

(9) Because the inner casing is fabricated from a transparent resin, the liquid crystal display section can be made watertight without the necessity of providing other parts such as a windshield or the like. Watertightness is therefore achieved reliably at low cost.

What I claim is:

1. An electronic clinical thermometer comprising:
   a clinical thermometer module comprising in turn:
      a circuit element and a liquid crystal display element mounted on a circuit substrate and housed in an inner casing; and
      an extendedly mounted sensor for sensing the body temperature;
   a soft flexible casing, integrally formed with a frame section covering the periphery of the inner casing and a probe for supporting the sensor, with an opening in the upper surface thereof for viewing the display section of the liquid crystal display element, and with an opening in the lower surface thereof for housing the clinical thermometer module;
   an upper cover for covering the opening in the upper surface of the frame section of the soft flexible case, and a lower cover for covering the opening in the lower surface of the frame section; and
   rib means for securing the upper and lower covers to the inner casing and interposedly support the soft flexible casing, the rib means including ribs on at least one of the casing and the cover which are oriented substantially parallel to axes of the respective openings, wherein the rib means substantially permanently secure the cover to the casing and establish a watertight seal between them.

2. The electronic clinical thermometer according to claim 1 wherein:
   a plurality of ribs is provided across almost the entire periphery of the inner peripheral edge of the frame section of the soft flexible casing; and
   the inner casing is interposedly supported by the ribs.

3. The electronic clinical thermometer according to claim 2 wherein:
   a plurality of holes is provided in the ribs of the soft flexible casing;
   a plurality of pins is provided on the peripheral edges of the upper and lower covers; and
   the pins are inserted into the holes in the ribs when the electronic clinical thermometer is assembled.

4. The electronic clinical thermometer according to claim 1 wherein:
   on the inner casing, at least the part corresponding to the liquid crystal display section is formed from a transparent resin;
   an opening is provided in the upper cover corresponding to the liquid crystal display section; and
   the liquid crystal display can be viewed through the opening in the upper cover and through the transparent section of the inner casing.

5. The electronic clinical thermometer according to claim 1 wherein:
   a lead wire from the sensor of the clinical thermometer module is connected to the circuit substrate through a flexible tube; and
   one end of the flexible tube is connected to the inner casing in a watertight manner.

6. The electronic clinical thermometer according to claim 2 wherein:
   the ribs on the soft flexible casing project from the mounting sides of the upper and lower covers; and
   the rib projections are inserted into and adhere closely to grooves in the peripheral edges of the upper and lower covers.

7. The electronic clinical thermometer of claim 1, the rib means further comprising:
   grooves on at least one of the casing and the cover which cooperate with the ribs and which are oriented substantially parallel to axes of the respective openings, the ribs and grooves being further shaped so that they become engaged by securing the cover parallel to said axes towards each other and so that once engaged, the ribs and grooves substantially permanently secure the cover to the casing and establish a watertight seal between them.

* * * * *